July 29, 1924.  
D. R. HELSER  
1,503,046
VEHICLE WHEEL
Filed Aug. 31, 1923
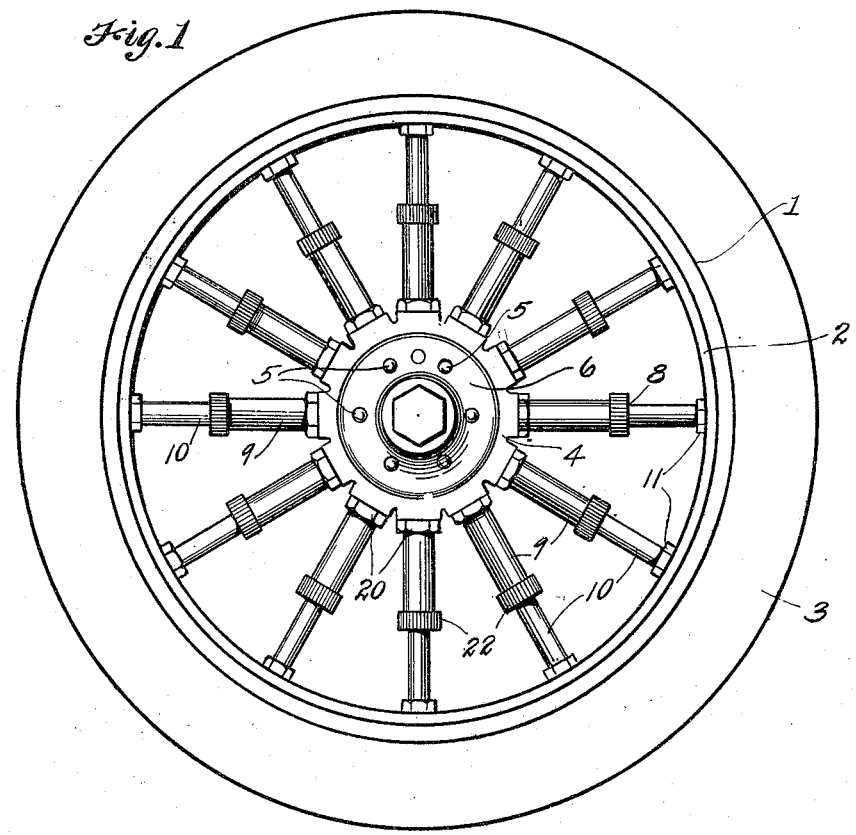
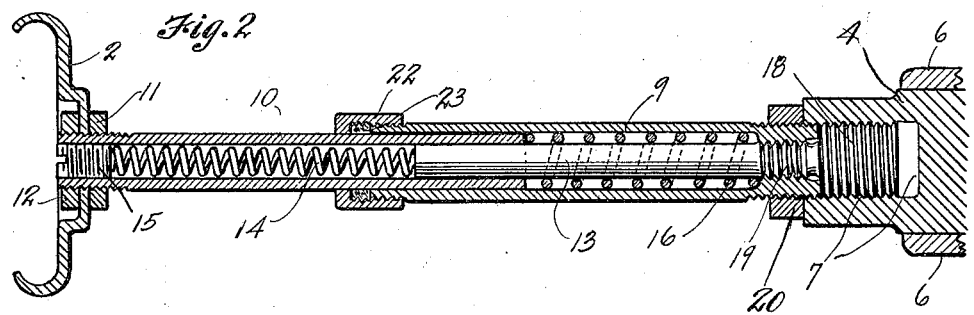
INVENTOR
DAVID R. HELSER
BY
Richard J. Cook
ATTORNEY Patented July 29, 1924.

1,503,046

UNITED STATES PATENT OFFICE.

DAVID R. HELSER, OF OLYMPIA, WASHINGTON.

VEHICLE WHEEL.

Application filed August 31, 1923. Serial No. 660,421.

*To all whom it may concern:*

Be it known that I, DAVID R. HELSER, a citizen of the United States, and a resident of Olympia, Thurston County, Washington, have invented certain new and useful Improvements in Vehicle Wheels, of which the following is a specification.

This invention relates to improvements in vehicle wheels and has for its principal object to provide resilient wheels especially useful for automobiles, trucks, tractors, etc., wherein resiliency is provided for without impairing the rigidity or durability of the wheels.

More specifically, the object of the invention is to provide a wheel of the above character having a yieldable rim supported in a substantially rigid manner from the wheel hub by means of resilient spokes, which, due to their form of construction, permit the desired resilience in the rim whereby the usual jar and vibration incidental to travel over rough and uneven surfaces is reduced to a minimum.

Another object of the invention is to provide a wheel of the above character equipped with resilient spokes, each of which comprises inner and outer telescopically joined sections that are fixed respectively to the wheel hub and to the rim and wherein relative movement of the sections is yieldably resisted by means of inclosed springs or its equivalents.

Other objects of the invention reside in the various details of construction and combination of parts whereby a durable and efficient wheel is provided.

In accomplishing these and other objects of the invention, I have provided the improved details of construction, the preferred forms of which are illustrated in the accompanying drawings, wherein—

Figure 1 is a side view of a wheel constructed in accordance with the present invention.

Figure 2 is an enlarged, longitudinal section of one of the spokes, illustrating the manner in which it is mounted within the wheel hub and rim.

Referring more in detail to the drawings, 1 designates, as a whole, a vehicle wheel constructed in accordance with the present invention, comprising a rim 2 whereon a tire 3 is mounted and a hub ring 4 that is secured by bolts 5 between the opposite side plates 6 of the hub. This ring is provided at spaced intervals with threaded sockets 7 for receiving the ends of the spokes 8 which embody the principal part of this invention.

The rim of the wheel, in this construction, preferably would be of metal and sufficiently flexible that it would yield under pressure or jar that follows the striking of a bump, stone, or other obstruction in a roadway, but which would be sufficiently strong to hold up under all ordinary use.

Any suitable or desirable number of spokes could be used in a wheel and each spoke in its preferred form would comprise a tubular inner section 9 that is threaded at its inner end into the ring 4 and an outer tubular section 10 that is telescopically extended within the tube 9 and at its outer end extends through an opening in the rim 2 and is fixed therein by means of nuts 11 and 12 threaded thereon against the inner and outer faces of the rim.

Threaded into the inner end of the spoke section 9, as at 19, and extended co-axially within it is a plunger, or rod, 13, which extends slidingly within the tube 10. A coiled spring 14 is disposed within the tube 10 which bears at its ends against the outer end of the rod 13 and against a plug 15 that is threaded into the outer end of the tube. A coiled spring 16 is likewise disposed within the tube 9 about the rod 13 which bears against the inner end of the tube section 10 and the base of the tube 9.

In this construction the rods 13 are mounted upon heads 18 that are threaded into the sockets 7 and which seat against the inner ends of the tubes 9. Lock nuts 20 are threaded onto the tubes 9 to seat against the hub ring to retain the spokes at adjusted positions. Packing rings 22 are threaded into the outer end of the tubes 9 which retain a packing material as indicated at 23 whereby leakage of oil and air is prevented.

With the wheel so constructed it is readily apparent that the resilient spokes will permit resilience in the rim and that this will absorb the jolt and vibration incidental to rough roads. It is further apparent that the construction provided will insure rigidity in the wheel without affecting the resilience that is desired.

Having thus described my invention, what I claim as new therein and desire to secure by Letters Patent, is:

1. A vehicle wheel comprising a resilient tire supporting rim, a hub ring having threaded sockets therein and a plurality of spokes each of which comprises an inner tubular section that is threaded within a socket of the hub ring, an outer tubular section that is fixed to the rim and is telescopically slidable within the inner section, plungers for the spokes having head portions threaded into the sockets and against which the spoke ends abut with the rods extending within the inner spoke section and slidable into the outer, a plug threaded through the outer end of the outer section, a spring disposed within the outer section to bear against the plug and outer end of the plunger and a spring mounted within the inner section about the plunger and bearing at its end against the inner end of the outer spoke section and against the base end of the inner section.

2. In a vehicle wheel, a resilient rim, a socketed hub ring, and a plurality of spokes each comprising an inner tubular section having an exteriorly threaded inner end portion for mounting within a hub ring socket, an outer tubular section telescopically fitted within said inner section having an exteriorly threaded outer end portion for mounting within the wheel rim, a plug closing the outer end of said outer tubular section; a plunger contained concentrically within the said inner tubular section and fitted slidably within the outer tubular section; said plunger having an exteriorly threaded mounting head abutted against and continuing from the threaded inner end portion of the inner tubular section and adapted for mounting also within the wheel hub member and having a section just within said head that is threaded into the inner end of said inner tubular section; a coiled spring located within the outer tubular section and bearing against said outer end closing plug and outer end of the plunger, and a coiled spring disposed about the plunger within the inner tubular section.

Signed at Olympia, Washington, this 3rd day of August, 1923.

DAVID R. HELSER.